Sept. 1, 1964     L. ELSBETT     3,146,764
ENGINE SUPERCHARGING

Filed Feb. 14, 1963     2 Sheets-Sheet 2

INVENTOR
*Ludwig Elsbett*

BY *Bailey, Stephens & Huettig*
ATTORNEYS

United States Patent Office 3,146,764
Patented Sept. 1, 1964

3,146,764
ENGINE SUPERCHARGING
Ludwig Elsbett, Nurnberg, Germany, assignor to Maschinenfabrik Augsburg-Nurnberg A.G., Nurnberg, Germany
Filed Feb. 14, 1963, Ser. No. 258,499
Claims priority, application Germany Feb. 24, 1962
8 Claims. (Cl. 123—32)

This invention relates to piston engines having air intake openings and, in particular to the supercharging of air for an internal combustion engine or a piston air compressor.

In this invention, the kinetic energy of the intake air sucked into the working cylinder is influenced by the air intake pipe coupled to the air intake opening into the cylinder in such a way that the cylinder, during the gas change-over period, receives as large as possible weight of air in order to re-fill the cylinder with intake air. This is important in order to obtain the maximum engine capacity. In fuel injection engines, such as Diesel engines, it is also essential that the direction of the intake air is given a certain direction by means of a twisted intake channel or a masked valve so that the air swirl is formed in the cylinder so that it rotates around the cylinder axis. This is according to the fuel combustion process as disclosed in the U.S. patent to Meurer et al. No. 2,907,308. The air swirl must be kept non-turbulent during fuel injection so that the injected fuel is first formed on the wall of the cylinder, vaporized therefrom, and mixed with the swirling air.

It has heretofore been proposed with regard to a four-cycle engine to create resonant vibrations in the column of the intake air in the intake pipe for increasing the quantity of intake air forced into the engine cylinder during the piston air intake stroke. The pipe used in such case is of a length such that the vibration or wave created when the intake valve is opened immediately after the beginning of the piston suction stroke travels through the intake air pipe and is reflected back to the entrance to the pipe. Just before the intake valve closes, this wave reaches the engine cylinder as a low pressure wave and thus increases the amount of air forced into the cylinder in accordance with its pressure and size. However, since the time periods for the opening of the intake and exhaust valve change with the change in engine speed or r.p.m. and as the velocity of these reflected pressure waves remains the same, at about the velocity of sound, the timely entrance of the reflected pressure waves into the cylinder is only assured with the use of an intake pipe having a length adjusted to the engine speed or r.p.m. Thus an intake pipe of a fixed length can be effective only in an engine having a constant engine speed or r.p.m., which means a very limited effective range for the use of such pipe. In engines having various r.p.m.'s, as in the case of trucks and passenger cars, it has been suggested that intake pipes of changeable lengths be used as by being telescoped so that they can be adjusted in length manually or automatically in response to the engine speed. However, for safe driving, it cannot be expected of the automobile driver to handle additional control devices, particularly those requiring a certain amount of skill for adjusting the pipe to a proper length to the r.p.m. of the engine. On the other hand, if the length of the pipe is automatically adjusted by the engine speed, the number of control elements and their maintenance is such that the engine becomes expensive and takes up more space.

According to this invention, these heretofore methods involving the use of reflected pressure waves for increasing the quantity of the intake air into the cylinder are completely deviated from. In this invention, the length of the intake pipe is selected in such a way, and further the admission of intake air into the cylinder is controlled with regard to time in such a way that the column of intake air in the intake pipe during the piston suction stroke is substantially accelerated or moved by the motion of the piston and thus only the pressure of the mass of the moving column of air is effective in filling the cylinder. Consequently, any reflected movement of the intake air is supressed as much as possible, and the length of the intake pipe, with its corresponding column of intake air, is chosen so that this column of air follows the process of gas change over in the cylinder throughout its entire length. By this invention, it is possible to keep the length of the intake pipe very short and to also eliminate the adjusting of the intake pipe with relation to a change in engine speed. The greater or lesser pressures existing in the working cylinder are thus changed into the pressure of the mass of the moving column of intake air.

The column of air within the intake pipe is accelerated through the duration of the suction stroke of the piston corresponding to the increase of the velocity of the piston. The energy required for this acceleration comes from the piston and not from a pressure wave which, of course, is also started by the piston. If the engine piston does not reach its maximum velocity during the intake air suction period and starts to slow down, then the whole process is reversed as the moving column of intake air imparts its energy, previously taken from the piston, to the piston in the form of the pressure of the mass of air. At the same time, air entering the cylinder above the piston has achieved the intended state in that the air swirl formed about the axis of the cylinder is not disturbed by turbulence.

The effect of this air mass increases with the number of engine r.p.m.'s as long as the source of energy, that is the vacuum pressure during the first part of the suction period of the piston, is sufficiently strong in order to accelerate the column of intake air and while this air is exclusively subjected to the control of the piston movement. If the mass of intake air depending upon this piston energy is too large beginning with a certain r.p.m., then because of the inertia of this air mass, it would take too long to accelerate this air mass so that the time between the opening and closing of the intake valve is not long enough and no time remains to fill the cylinder with air. However, according to this invention, such will only happen at engine speeds which lie far above 4,000 r.p.m., and thus is not of concern with respect to Diesel engines which usually have an engine speed of from 3,000 to 4,000 r.p.m.

The maximum length for the intake pipe in which the column of intake air exclusively follows the movement of the piston is simply determined by measuring the delivery rate of the air to the cylinder. An increase or decrease in the air delivery rate relative to the engine speed indicates the length of the intake pipe from which point the mass of the column of intake air in the pipe can no longer follow the movement of the piston. Consequently, certain maximum and minimum conditions are apparent in the rate of the delivery of the intake air above a certain r.p.m. of the engine speed. Then the cross-sectional area of the intake pipe is reduced until the increase of the resistance equalizes the increase of the effect of the air mass.

In a further feature of this invention, the occurrence of reflected waves is further suppressed in that the intake valve, following piston upper dead center, only opens when the pressure in the cylinder has fallen to the level of the pressure in the intake pipe. Since the size of the pressure wave depends upon the pressure gradient between the pressure chamber and the intake pipe, it is easy to measure the pressure difference. Therefore, the correct period of time for opening the intake valve can be determined, and that is when the pressure differences are either zero or at least so small that the distrubing pressure waves of different origin which occur primarily and first of all in the form of reflected pressure waves are never larger than the pressure of the mass of the column of intake air. A shifting of the opening time for the intake valve at or after the piston upper dead centre has the further advantage that the lifting of the valve is not disturbed or influenced by the rising of the piston, that is the piston can no longer strike the valve head or the seat and therefore the valve head, as well as the piston, is not subject to such damage. Because of the shift in the opening time of the intake valve, it is also possible to do without the valve pockets previously used which, in many cases, substantially disturb the air swirl in the chamber. The same advantage relating to avoiding the disturbing pressure waves is obtained for the exhaust valve in that it is possible for the exhaust valve in the piston upper dead centre to remain open for approximately 0.5 millimeter by giving the exhaust valve cam a dwell section which extends over the engine crankshaft angle of about 20 degrees. This feature can also be used to avoid reflected waves in the intake system.

When several cylinders are combined with one intake system, then only those cylinders which are connected to a common intake pipe are those which do not overlap in their suction cycles or do so just barely. In a six-cylinder internal combustion engine, it is preferred that a cylinder firing order of 1-5-3-6-2-4 be used, and that the cylinders which lie adjacent to each other, that is 1-2-3 and 4-5-6 are each given a separate pipe respectively. According to this invention, these pipes are not directly connected to each other since otherwise distrubing pressure waves might be produced. Actually the two intake pipes of a six-cylinder engine are connected by means of a common pressure equalizer, and for which purpose the air intake filter is used.

The means by which the objects of the invention are obtained are disclosed more fully with reference to the accompanying schematic drawings in which.

Figure 1:
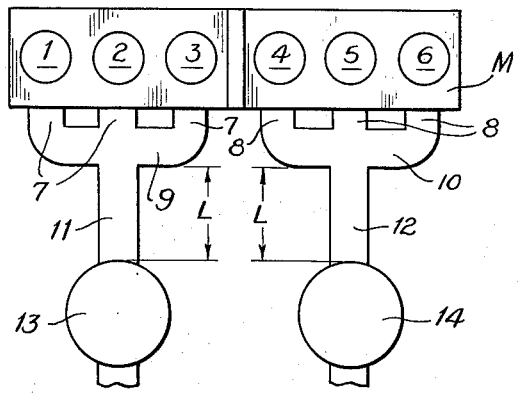
FIGURE 1 is a representation of a six-cylinder internal combustion engine divided into two groups of three cylinders each, and each group having a separate intake pipe and pressure equalizer.

As shown in FIGURE 1, the six-cylinder four-cycle internal combustion engine M is divided into two cylinder groups of three cylinders each, that is cylinders 1-2-3 and cylinders 4-5-6. Engine M$h$ as a firing order of 1-5-3-6-2-4. Cylinder group 1-2-3 is connected by short pipe pieces 7 to a header 9 which is joined to the air intake pipe 11. Likewise cylinder group 4-5-6 is joined by short pipe pieces 8 to header 10 connected to air intake pipe 12. The free ends of intake pipes 11 and 12 each have, respectively, a pressure equalizer 13-14, and each equalizer can be an air filter. The length L of the air intake pipes 11 and 12, as well as their cross-sectional area, is selected so that they hold the mass of air provided for the volume of one cylinder. During each piston intake stroke and corresponding to the suction stroke order of 1-3-2 and/or 5-6-4 which do not or at least just barely overlap, a column of air is put into motion in the respective intake pipe, which column has a length making this possible by the given energy which is the vacuum pressure during the first part of the piston stroke, as well as the specified time and without the aid of reflected waves in the intake pipe whereby the desired effect of the mass of the moving column of air is achieved. Also, the opening of the intake valve takes place only when the pressure in the working cylinder is approximately equal to the pressure in the intake pipe. Furthermore, the exhaust valve in the upper piston dead centre point remains opened approximately 0.5 millimeter by reason of a dwell section extending over an angle of about 7.5 degrees in the exhaust valve cam 19. Neither intake air pipe 11 or 12 within a given range of engine speed does not need to be changed with regard to its length. It has been found that it is especially advantageous to give each intake pipe 11 and 12 a length L of approximately 300±50 mm., the ratio between the pipe length and the pipe diameter being smaller than 15:1. The mass energy of the column of intake air in each intake pipe which has been accelerated during the first part of the suction stroke of the piston is so large at the end of the piston stroke that it forces the intake air to flow into the engine cylinder almost uniformly against all other reflected pressure waves which must be present. Thus when using an air swirl in the engine cylinder, a disturbing reflected air movement is impossible. A force is thus used to obtain a greater air filling in the cylinder.

Figure 2:
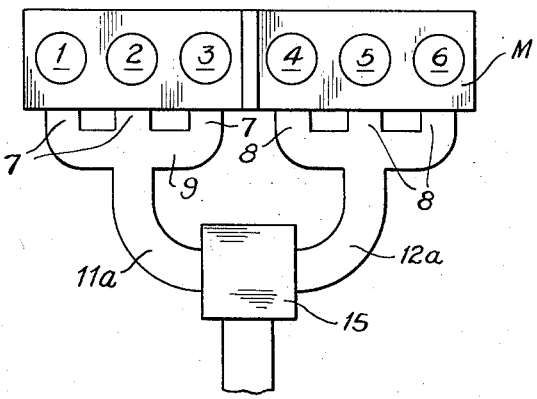
FIGURE 2 is a similar view of a modification in which the two intake pipes have a common pressure equalizer.

As shown in FIGURE 2, the elements similar to FIGURE 1 are given the same reference numerals. However, the two intake pipes 11$a$ and 12$a$ are joined to each other by means of a pressure equalizer which is an equalizer common to both groups of three cylinders 15. This modified construction has been found in practice to be especially favourable with regard to the mass effect of the intake air column.

Figure 3:
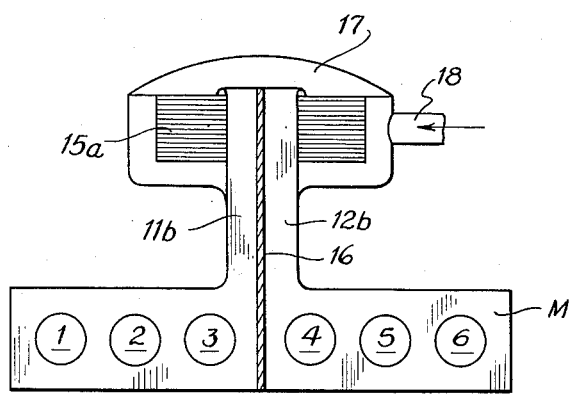
FIGURE 3 is a further modification in which the intake air filter is used as a common pressure equalizer.

FIGURE 3 shows a very practical combination in which the intake air filter is used as the pressure stabilizer for the intake pipe. In the schematic cross-sectional view of FIGURE 3, a round intake air pipe is connected to the engine M. However, this pipe has been divided into separate air intake pipes 11$b$ and 12$b$ by means of a partition 16. This partition extends into the air filter so as to include the necessary length L for each pipe 11$b$ and 12$b$. The filter is composed of a filter cell 15$a$ above which is an air space 17 serving as the pressure equalizer and to which intake air is supplied through air pipe 18.

Figure 4:
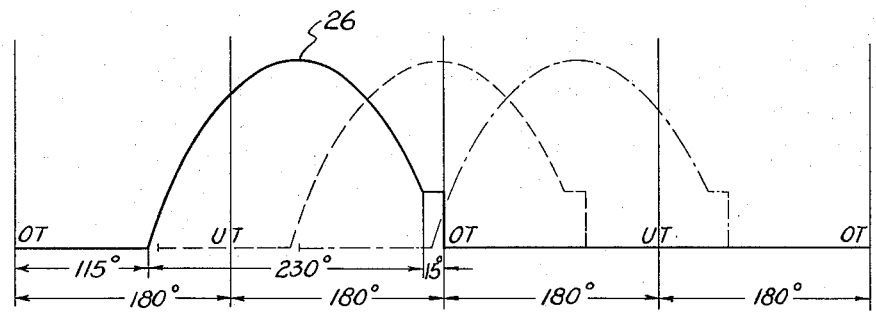
FIGURE 4 is a valve opening diagram for the exhaust valve.

FIGURE 4 shows the intake valve opening curves of three cylinders in a six-cylinder machine. The three cylinders 1, 2, 3 have a common air intake pipe separate from that of the other three cylinders as shown in FIGURE 1. The firing order of the engine is selected so that there is an ignition interval of 230 degrees and, accordingly, the valve opening curves 26 have been drawn for a duration of 230 degrees. The individual valve opening curves are spaced 15 degrees apart because no overlapping is desired.

Figure 5:
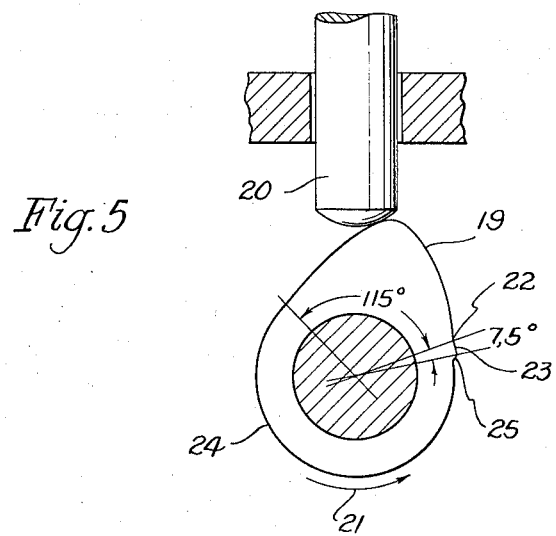
FIGURE 5 is a diagram showing the cam profile and the cam follower.

FIGURE 5 shows an arrangement where the exhaust valve can be kept open about 0.5 millimeter at the top dead centre of the piston over about 20 degrees crankshaft angle. The exhaust valve cam is designated 19 and actuated by the cam follower 20. The cam 19 in the example shown rotates anti-clockwise as indicated by the arrow 21. When, towards the end of the exhaust stroke, this cam has reduced the exhaust valve opening to about 0.5 millimeter which is at the point 22 the cam flow moves on the dwell section 23 where the cam face is parallel to the base circle 24 of the cam over about 20 degrees crank angle. This causes the cam follower 20 to remain still while this section of the cam rotates under it, which means that the exhaust valve remains slightly open (0.5 millimeter) during this period. Only from point 25 onwards is final closing of the exhaust valve effected.

Having now described the means by which the objects of this invention are obtained, I claim:

1. In an air compressing piston engine, including an internal combustion engine, having an intake air pipe joined to the engine cylinder and in which the kinetic energy of the intake air is influenced by said pipe, the improvement in which the size of said pipe, with especial regard to its length, and the intake of air timed during the engine piston suction stroke, is such that substantially only the pressure of the mass of the column of intake air moving in said pipe is effective in filling the cylinder during the piston suction stroke, and substantially without forming reflected air pressure waves in said pipe.

2. In an engine as in claim 1, the improvement further comprising opening the intake valve for said cylinder only when the pressure in said cylinder is at least approximately equal to the intake air pressure in said pipe.

3. In an engine as in claim 2 and having a plurality of cylinders with a common air intake pipe, the improvement further comprising said pipe being common only to cylinders having piston suction strokes which barely overlap if at all.

4. In an engine as in claim 3 and having six four-cycle cylinders firing in the order of 1-5-3-6-2-4, the improvement in which cylinder group 1-2-3, and group 4-5-6, each have a common intake pipe, respectively.

5. In an engine as in claim 4, further comprising the pipes for each cylinder group being joined to a common air pressure equalizer.

6. In an engine as in claim 5, further comprising exhaust valve means in said cylinder for remaining open about 0.5 millimeter, and cam means for actuating said exhaust valve and having a dwell section extending over a crankshaft angle of about 20 degrees.

7. In an engine as in claim 6, said intake pipe having a length of 300±50 millimeters for an engine speed of from about 1,000 to 4,000 r.p.m., the ratio between the pipe length and the pipe diameter being 15:1.

8. In an engine as in claim 7, further comprising fuel nozzle means joined to said cylinder and associated with combustion chamber means for injecting the major portion of the fuel as a film on the wall of the combustion chamber means, said fuel being vaporized from said film, mixed with said air swirl, and then burned.

References Cited in the file of this patent

National Advisory Committee for Aeronautics, Technical Note No. 180 by Matthews et al.